United States Patent
Otani et al.

(10) Patent No.: US 6,177,532 B1
(45) Date of Patent: Jan. 23, 2001

(54) PROCESS FOR THE POLYMERIZING OF FLOURINE-CONTAINING OLEFIN MONOMER

(75) Inventors: Katsuhide Otani; Yoshiki Maruya; Yoshiyuki Hiraga; Satoshi Komatsu, all of Settsu (JP)

(73) Assignee: Daikin Industries, Ltd., Osaka (JP)

( * ) Notice: Under 35 U.S.C. 154(b), the term of this patent shall be extended for 0 days.

(21) Appl. No.: 09/269,306

(22) PCT Filed: Sep. 25, 1997

(86) PCT No.: PCT/JP97/03421

§ 371 Date: Mar. 29, 1999

§ 102(e) Date: Mar. 29, 1999

(87) PCT Pub. No.: WO98/14484

PCT Pub. Date: Apr. 9, 1998

(30) Foreign Application Priority Data

Oct. 4, 1996 (JP) ................................. 8-264409

(51) Int. Cl.[7] .................................. C08F 114/18
(52) U.S. Cl. .................. 526/249; 526/242; 526/253; 526/255
(58) Field of Search .................. 526/242, 249, 526/253, 255

(56) References Cited

U.S. PATENT DOCUMENTS 5,037,914 * 8/1991 Monti .................................. 526/206
5,460,447 * 10/1995 Wu et al. ............................ 366/279

FOREIGN PATENT DOCUMENTS

| 62-104815 | 5/1987 | (JP) | C08F/14/18 |
| 2-182710 | 7/1990 | (JP) | C08F/210/02 |
| 6-335626 | 12/1994 | (KP) | B01F/7/16 |

OTHER PUBLICATIONS

English Translation of International Preliminary Examination Report for PCT JP97/03421.

* cited by examiner

Primary Examiner—Helen L. Pezzuto
(74) Attorney, Agent, or Firm—Sughrue, Mion, Zinn, Macpeak & Seas, PLLC

(57) ABSTRACT

A polymerization process, in which when at least one of fluorine-containing olefin monomers in gaseous phase or supercritical phase or a monomer mixture of the fluorine-containing olefin monomer and other monomer copolymerizable therewith is subjected to batch polymerization in an aqueous medium while being diffused to the aqueous medium, a diffusing amount of the monomer or monomer mixture to the aqueous medium is not less than 80% of the theoretical consumption of the monomer or monomer mixture when polymerized at the theoretical polymerization rate. According to the present invention, a polymerization rate is determined by the polymerization reaction but not by the diffusion of monomer gas, and thus higher polymerization rate can be achieved.

13 Claims, 7 Drawing Sheets

PROCESS FOR THE POLYMERIZING OF FLOURINE-CONTAINING OLEFIN MONOMER

TECHNICAL FIELD

The present invention relates to a process for polymerizing a fluorine-containing olefin monomer by batch polymerization in an aqueous medium at or near a theoretical polymerization rate.

BACKGROUND ART

Among various plastics, fluorine-containing resins represented by polytetrafluoroethylene (hereinafter referred to as PTFE) and tetrafluoroethylene-hexafluoropropylene copolymer (hereinafter referred to as FEP) have particularly excellent heat resistance, chemical resistance, electrically insulating property, non-tackifying property, low friction property and the like, and thus have been widely used in the fields of not only chemical industry, electric and electronic industries and machine industry but also space development, aircraft industry and household goods. In order to obtain those fluorine-containing resins, any of polymerization processes such as bulk polymerization, solution polymerization, suspension polymerization and emulsion polymerization can be used. However, in bulk polymerization, it is difficult to regulate polymerization temperature because of large reaction heat generation, and it is difficult to take a produced polymer out of a reactor. In solution polymerization, a large amount of organic solvent is required and recovery thereof is necessary. Thus those polymerization processes are not suitable for industrial large-scale production. Usually suspension polymerization and emulsion polymerization have been used since regulation of polymerization temperature is easy and taking out a produced polymer, washing and solid/liquid separation are relatively easy. A feature of those two polymerization processes is the use of water as a reaction medium.

A fluorine-containing olefin monomer which is in gaseous phase at normal temperature generally has a very low solubility in water, which is a factor of making it impossible to sufficiently increase polymerization rate. In order to increase a monomer concentration in polymerization system (liquid phase), addition of a dispersant and emulsifing agent and increase in polymerization pressure have been conducted. Thereby though the polymerization rate can be increased to a certain extent, the polymerization rate-determining step would be not the polymerization reaction (growth reaction) itself but still the diffusion of monomer into the aqueous medium. It is if the polymerization reaction can become the polymerization rate-determining step, the highest polymerization rate which can be considered theoretically can be achieved. In conventional polymerization procedures, since diffusion of monomer was the polymerization rate-determining step, only the polymerization rate of at most up to 75% of the theoretical polymerization rate could be obtained. This is because, in conventional polymerization procedures, gas/liquid contact efficiency is not sufficient as compared with very high polymerization reactivity of fluorine-containing olefin monomers, thus monomer supply being unable to catch up with the high polymerization rate.

The reason why diffusion of monomer is the polymerization rate-determining step is observed in the fact that in case where polymerization conditions other than conditions for stirring system are the same, polymerization rate varies by changing a stirring speed and shapes of stirring blades and a reaction tank. In case where the polymerization reaction itself is the polymerization rate-determining step, the polymerization rate should not vary even if the stirring system is changed. Hitherto there have been no reports that when a fluorine-containing olefin monomer was polymerized in an aqueous medium, the polymerization reaction (growth reaction) but not the diffusion of monomer was employed as the polymerization rate-determining step. On the contrary, as described in examples of U.S. Pat. No. 5,266,639 and JP-B-61-43364, in order to keep a polymerization pressure and polymerization rate constant during the polymerization reaction, rotation speed for stirring has been changed properly.

An object of the present invention is to achieve a higher polymerization rate, that is, a higher polymerization productivity than that of conventional polymerization process by employing, as the polymerization rate-determining step, the polymerization reaction (growth reaction) itself or the reaction close thereto but not the diffusion of monomer when monomers containing fluorine-containing olefms are subjected to batch polymerization in an aqueous medium.

DISCLOSURE OF THE INVENTION

Namely, the present invention relates to the polymerization process, in which when at least one of fluorine-containing olefin monomers in a gaseous phase or super-critical phase or a monomer mixture of the fluorine-containing olefin monomer and other monomer copolymerizable therewith is subjected to batch polymerization in an aqueous medium while being diffused to the aqueous medium, a diffusing amount of the monomer or monomer mixture to the aqueous medium is not less than 80%, preferably not less than 90%, particularly preferably 100% of the theoretical consumption of the monomer or monomer mixture when polymerized at the theoretical polymerization rate.

It is preferable that the polymerization process of the present invention is conducted by using a gas/liquid contacting apparatus.

Examples of the preferred gas/liquid contacting apparatus are a gas absorbing equipment with stirring tank, shaking type reactor and liquid circulation type reactor.

BEST MODE FOR CARRYING OUT THE INVENTION

Figure 1:
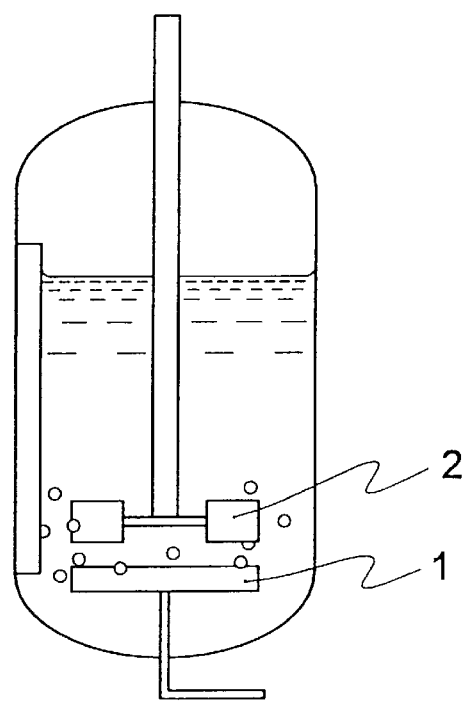
FIG. 1 is a diagrammatic cross-sectional view of the dip stirring type gas absorbing equipment with stirring tank being usable in the present invention.

The monomer to be subjected to the polymerization process of the present invention is at least one of fluorine-containing olefin monomers being in the gaseous phase or supercritical phase or a monomer mixture of the fluorine-containing olefin monomer and other monomer copolymerizable therewith.

The monomer being in the supercritical phase means a monomer being in the state exceeding the inherent critical temperature of the monomer. "Supercritical" is a well-known concept in the field of chemistry and can be said to be in a transferring phase between gas phase and liquid phase. Also according to the present invention, the monomer is in the gaseous or supercritical phase under the polymerization temperature and pressure.

The fluorine-containing olefin is selected from tetrafluoroethylene (critical temperature: 33° C., boiling point: −76° C.), hexafluoropropylene (critical temperature: 95° C., boiling point: −30° C.), vinylidene fluoride (critical temperature: 30° C, boiling point: −86° C.) and chlorotrifluoroethylene (critical temperature: 106° C., boiling point: −28° C.). The fluorine-containing olefin may be used alone or in a mixture thereof. Further the fluorine-containing olefin can be mixed to other monomer copolymerizable therewith to become a copolymer or to be slightly modified. Examples of the other monomer are perfluoro(alkyl vinyl ether), ethylene, and the like. Non-restricted examples of the fluorine-containing resin obtained by the process of the present invention are PTFE, FEP, tetrafluoroethylene-perfluoro(alkyl vinyl ether) copolymer, tetrafluoroethylene-hexafluoropropylene-perfluoro(alkyl vinyl ether) terpolymer, tetrafluoroethylene-ethylene copolymer, vinylidene fluoride homopolymer (hereinafter referred to as PVDF), tetrafluoroethylene-vinylidene fluoride copolymer, chlorotrifluoroethylene homopolymer, chlorotrifluoroethylene-ethylene copolymer, tetrafluoroethylene-hexafluoropropylene-vinylidene fluoride terpolymer, tetrafluoroethylene-vinylidene fluoride-chlorotrifluoroethylene terpolymer, and the like.

In the polymerization reaction of the present invention, conventional reaction conditions excluding conditions for stirring monomer can be used. The polymerization reaction is usually the batch polymerization to be carried out in a pressure resistive reactor, and the polymerization pressure is raised usually with the gaseous monomer. When the monomer is consumed by the polymerization, the polymerization pressure lowers but can be kept constant by supplying the monomer continuously or intermittently from the outside of the reactor. There is no limit in the polymerization pressure, and a pressure of not less than atmospheric pressure is usually used. The higher the pressure is, the more the degree of monomer solubility in water is increased. Therefore higher polymerization pressure is preferable to increase the polymerization rate.

Also there is no limit in the polymerization temperature. The polymerization temperature is selectively determined so as to be suitable for decomposition temperature of polymerization initiator to be used. A well-known radical initiator which is activated at the selected polymerization temperature is used as the polymerization initiator of the present invention. Preferred radical initiators are a fluorine-containing peroxide being slightly soluble in water, and the like in suspension polymerization, and a water-soluble persulfate or organic peroxide in emulsion polymerization. The radical initiator is not limited to them. Further a chain transfer agent can be added to adjust molecular weight of produced polymer.

The polymers produced according to the present invention are usually in the form of powder in suspension polymerization and in the form of emulsion in emulsion polymerization. Those polymers can be converted to a desired form through known post-treatment and put into practical use.

The polymerization process used in the present invention is known suspension polymerization or emulsion polymerization as mentioned above, and water is used as a medium in polymerization system. In that case, an aqueous medium such as water/chlorofluorocarbon mixture is also employed in suspension polymerization. In any polymerization processes, a dispersant such as paraffin or chlorofluorocarbon described in U.S. Pat. No. 2,612,484 and a fluorine-containing emulsifying agent described in U.S. Pat. No. 2,559,752 can be added.

When the fluorine-containing olefin monomer is polymerized in the aqueous medium, in order to employ, as the polymerization ratedetermining step, the polymerization reaction (growth reaction) or a reaction close thereto instead of the diffusion of monomer, it is essential to continuously and efficiently supply the less water-soluble fluorine-containing olefin monomer being in the gaseous phase or in the supercritical phase to the polymerization system. If possible, it is necessary to supply the monomer in an amount equal to or near the amount consumed by the polymerization at the theoretical polymerization rate. Since the monomer is in the gaseous phase or supercritical phase and the polymerization is carried out in the aqueous medium (liquid phase), a stirring/reaction tank system having a high gas/liquid contact efficiency is desired. For that purpose, in the present invention, it is preferable to use a gas/liquid contacting apparatus.

In the present invention, a "theoretical polymerization rate" is a value obtained by dividing an amount of polymer (yield of polymer) which is produced through batch polymerization per unit water volume by a period of time required for the reaction (reaction time). Its unit is g/ml-water/sec. A concept of polymerization rate used usually is an amount of polymer produced per unit time per unit volume. In case of polymerization reaction of batch type, since a monomer concentration is decreased or a particle size is increased with advance of the polymerization reaction, the polymerization rate is a time-based differential value of the yield of polymer at each point of time. In general the usual polymerization rate varies momentarily with advance of the polymerization. It should be noted that as mentioned above, the polymerization rate defined in the present invention is strictly a value obtained by dividing an amount of polymer produced per unit water volume by the whole reaction time, and is different from the above-mentioned usual polymerization rate.

The "theoretical consumption" of monomer in the present invention means an amount of monomer consumed in case where the monomer was reacted at the theoretical polymerization rate.

Those "polymerization rate" and "theoretical consumption" of monomer can be calculated by radical polymerization rate equation and emulsion polymerization rate equation under polymerization rate-determination conditions, and also can be recognized experimentally.

Namely, under the same polymerization conditions (polymerization pressure, polymerization temperature, kind and composition of monomers, kind and amount of a catalyst, amount of water, kinds and amounts of a chain transfer agent, dispersant and emulsifying agent, and the like) other than factors (the number of rotations described later, the number of shakings, flow of monomer, liquid circulating amount, and the like) taking part in a gas/liquid contact efficiency under a certain polymerization conditions, polymerization reaction is carried out. Then the polymerization reactions are repeatedly carried out while increasing a gas/liquid contact efficiency step by step. In that case, the polymerization rate reaches a region where the polymerization rate is constant, that is, a region where the polymerization rate does not change even if the gas/liquid contact efficiency varies, and such a constant polymerization rate is regarded as the theoretical polymerization rate.

In the present invention, a gas/liquid contacting apparatus is used to increase an amount of monomer to be diffused. Examples of the preferred gas/liquid contacting apparatus are a gas absorbing equipment with stirring tank, shaking type reactor, liquid circulation type reactor, and the like.

Examples of the gas absorbing equipment with stirring tank are dip stirring type (FIG. 1), surface stirring type (FIG. 2), self-suction stirring type (FIG. 3), horizontal stirring type (FIG. 4), stirring type with a large blade (FIG. 5), and the like.

The dip stirring type, as shown in FIG. 1, employs such a method that a sparger ring 1 and blowing nozzles are disposed under a stirring blade 2 and the monomer gas is supplied directly to the liquid phase to finely disperse the monomer gas with the stirring blade 2. This method is excellent in the point that the gas/liquid contact efficiency can be changed by two factors, i.e., the monomer gas flow and the number of rotations, but it is necessary to pay attention to the point that clogging of nozzle outlets by the produced polymer occurs easily.

Figure 2:
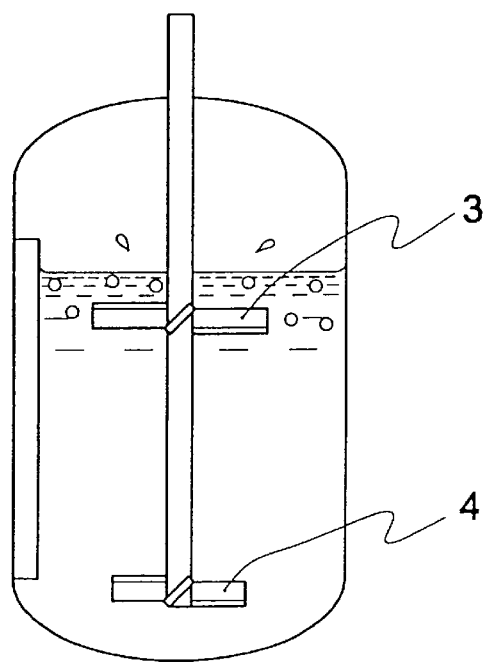
FIG. 2 is a diagrammatic cross-sectional view of the surface stirring type gas absorbing equipment with stirring tank being usable in the present invention.

The surface stirring type, as shown in FIG. 2, employs such a method that a relatively large stirring blade 3 is provided near free surface of the liquid phase and also a stirring blade 4 is provided at the lower part of a stirring tank, thus swallowing up the monomer gas in the gas phase in the form of gas bubbles by the rotation of the upper stirring blade 3 and at the same time, raising liquid droplets from the liquid phase to increase gas/liquid contact efficiency. This method is excellent from the point that a gas absorbing efficiency is high, but is apt to be affected by the shape of the stirring blade 3.

Figure 3:
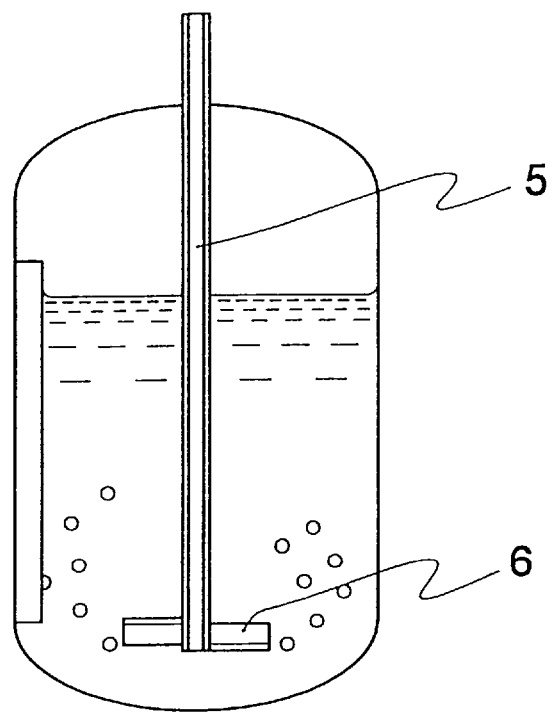
FIG. 3 is a diagrammatic cross-sectional view of the self-suction stirring type gas absorbing equipment with stirring tank being usable in the present invention.

The self-suction stirring type, as shown in FIG. 3, employs such a method that the tank is equipped with a hollow shaft 5 and hollow stirring blade 6 and the monomer gas in the gas phase is taken into the liquid phase through the hollow shaft 5 by suction caused by the rotation of the stirring blade 6. Though this method is excellent from the point that it is easy to utilize the whole gas, it is necessary to pay attention to clogging of the inside of the shaft and stirring blade by the produced polymer.

Figure 4:
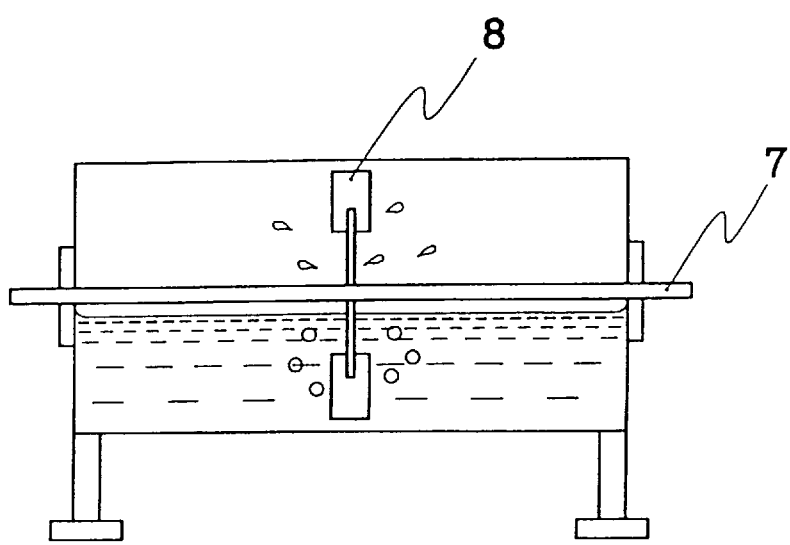
FIG. 4 is a diagrammatic cross-sectional view of the horizontal stirring type gas absorbing equipment with stirring tank being usable in the present invention.

The horizontal stirring type, as shown in FIG. 4, employs such a method that the monomer gas is taken in the form of bubbles into the liquid phase from the gas phase by the rotation of a stirring blade 8 mounted on a horizontal shaft 7 and at the same time liquid droplets are raised from the liquid phase to increase the gas/liquid contact efficiency. This method is excellent in the point that a gas-liquid interface area can be made large, but it is necessary to pay attention to the flow of the liquid rotating in the same direction as the stirring blade at the wall of the tank by centrifugal force.

Figure 5:
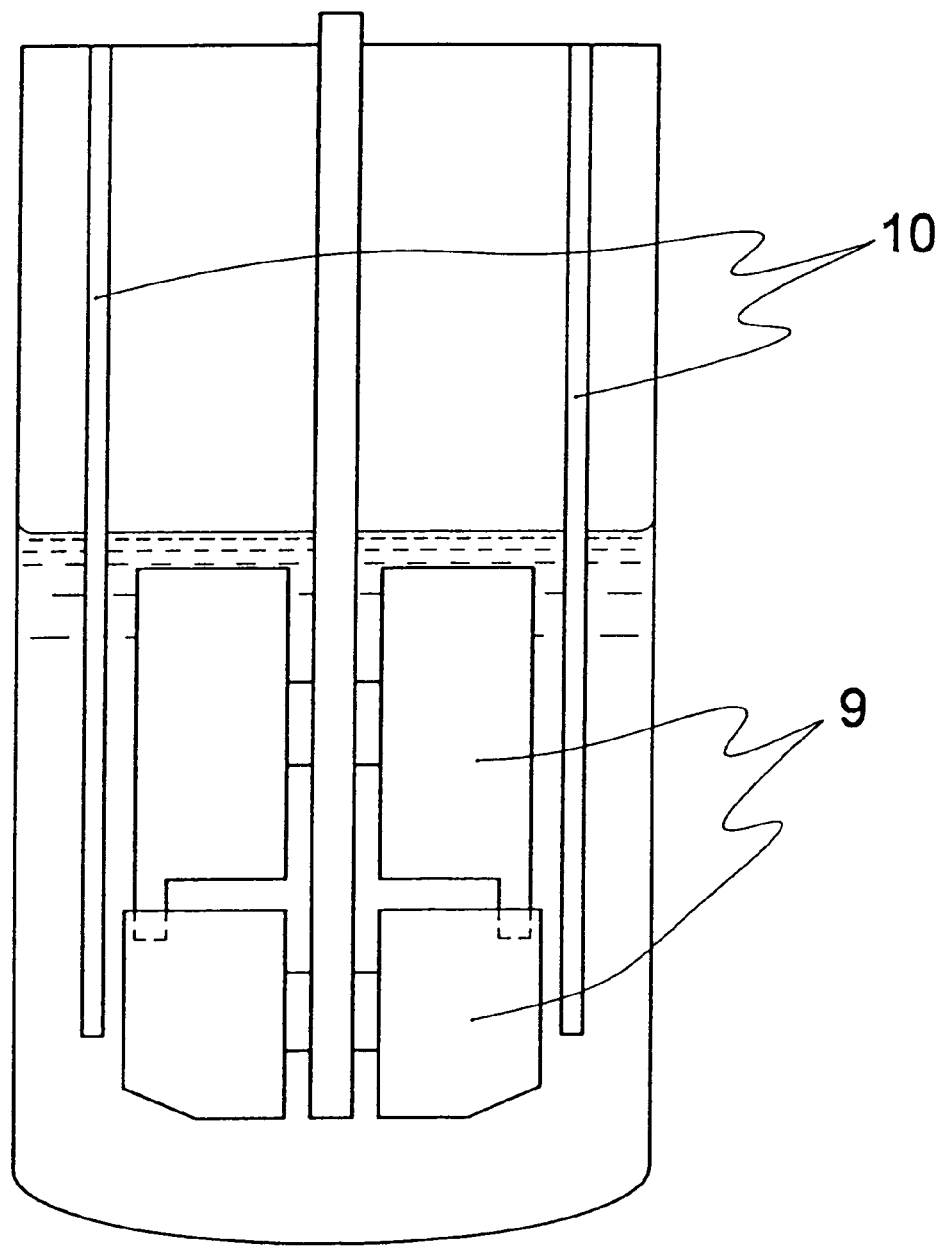
FIG. 5 is a diagrammatic cross-sectional view of the stirring type gas absorbing equipment with stirring tank having large blade which is usable in the present invention.

The stirring type with a large blade employs such a method of using a stirring tank having a full-zone blade 9 shown in FIG. 5. In addition, there is a method of using the stirring tank having a large stirring blade such as MAXBLEND, SANMELER, or the like. In any of these methods, while balancing an axial flow and a radial flow which are generated by the rotation of the large size stirring blade by using baffle plates 10 or the like, the monomer gas is taken in from the free surface. Though these methods are excellent in the points of heat transfer efficiency and low consumption of motor power, it is necessary to pay attention to the point that deviation of an axis occurs easily.

The baffle plates may be used optionally for other stirring type gas absorbing equipments.

In these stirring type gas absorbing equipments, a main factor taking part in the gas/liquid contact efficiency is a tip speed of the stirring blade (or the number of rotations in the case of the same stirring blade). In the present invention, when the tip speed is set within the range of not less than 0.5 m/sec, preferably from 1 to 5 m/sec depending on the stirring method, the rate of the polymerization reaction is not determined by the amount of monomer gas to be diffused and the polymerization rate becomes the theoretical polymerization rate. If the tip speed is too high, energy for driving becomes large and besides coagulation of the produced polymer occurs in the emulsion polymerization, which is not preferable. Also in case of the dip stirring method, it is necessary that an amount of monomer gas to be supplied directly to the liquid phase is not less than an amount of the monomer gas to be consumed in the polymerization. It is preferable that the monomer gas is supplied in an amount of not less than three times the amount to be consumed in the polymerization. In that case, in order to maintain the polymerization pressure constant, excess monomer gas may be released from a back pressure regulator. With respect to the shape of the stirring blade of the gas absorbing equipment with stirring tank, there is no restriction as far as it is suitable for each type of equipment. Particularly in case of the dip stirring type, a disc turbine blade which can disperse gas bubbles more finely is desirable.

Figure 6:
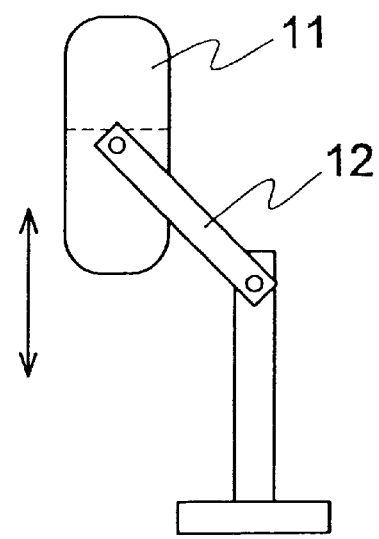
FIG. 6 is a diagrammatic side view of the shaking type reactor being usable in the present invention.

The shaking type reactor, as shown in FIG. 6, employs such a method that a reaction tank 11 having a liquid phase and gas phase (monomer gas) is shook up and down with a crank 12 to carry out contacting of gas and liquid. Besides the vertical reciprocating motion, a reciprocating motion in the horizontal direction and rotational motion can be adopted. Though that type of reactor is excellent in the point that no stirring mechanism is required, a drawback of it is a large motor power consumption. A main factor taking part in the gas/liquid contact efficiency in the shaking type reactor is the number of shakings per unit time.

Figure 7:
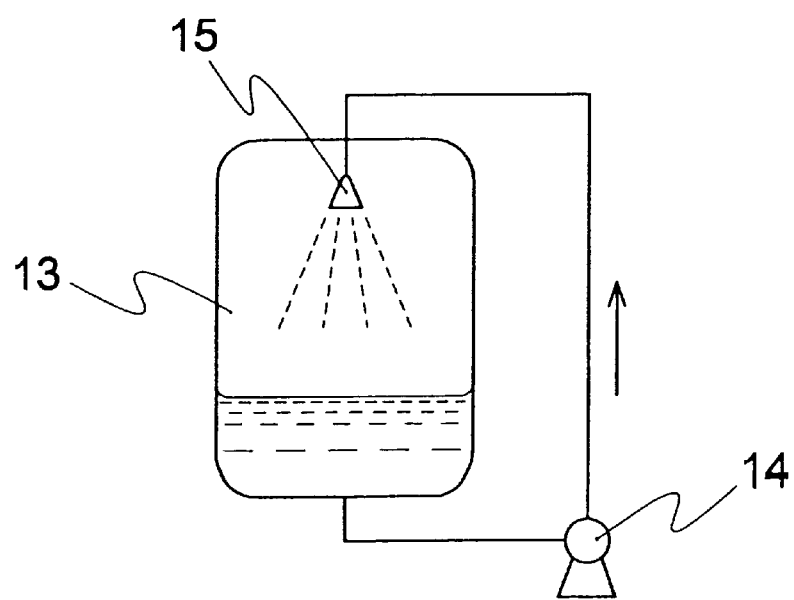
FIG. 7 is a diagrammatic cross-sectional view of the liquid circulation type reactor being usable in the present invention.

The liquid circulation type reactor, as shown in FIG. 7, employs such a method that in a reactor 13 charged with the monomer gas, an aqueous medium forming a liquid phase is circulated by a circulation pump 14 and sprayed through a spray nozzle 15 into the gas phase. Though this method is also excellent in the point that no stirring mechanism is required, it is necessary to pay attention to the clogging of nozzles by the produced polymer. A main factor taking part in the gas/liquid contact efficiency in the liquid circulation type reactor is an amount of liquid to be circulated.

In the present invention, in principle the polymerization reaction rate is determined by the theoretical polymerization rate. The factors determining the polymerization reaction rate are kind and amount of a polymerization catalyst, kind and composition of a monomer, polymerization temperature, polymerization pressure, kinds and amounts of a chain transfer agent, dispersant and emulsifying agent, the number of particles, and the like. The theoretical polymerization rate can be varied by changing these factors. As mentioned above, in conventional polymerization process steps, in which the rate-determining step was the diffusion of gas, only the polymerization rate of at most 75% of the theoretical polymerization rate was obtained. However according to the present invention, the diffusion of gas can be assumed to be one of many factors for changing the polymerization rate. Thus the present invention includes the process for polymerizing in the region of not less than 80% of the theoretical polymerization rate by regulating the factor of gas diffusion.

The present invention is then explained by means of examples, but are not limited to them.

EXAMPLE 1
(Emulsion polymerization of PTFE with sparger)

Figure 8:
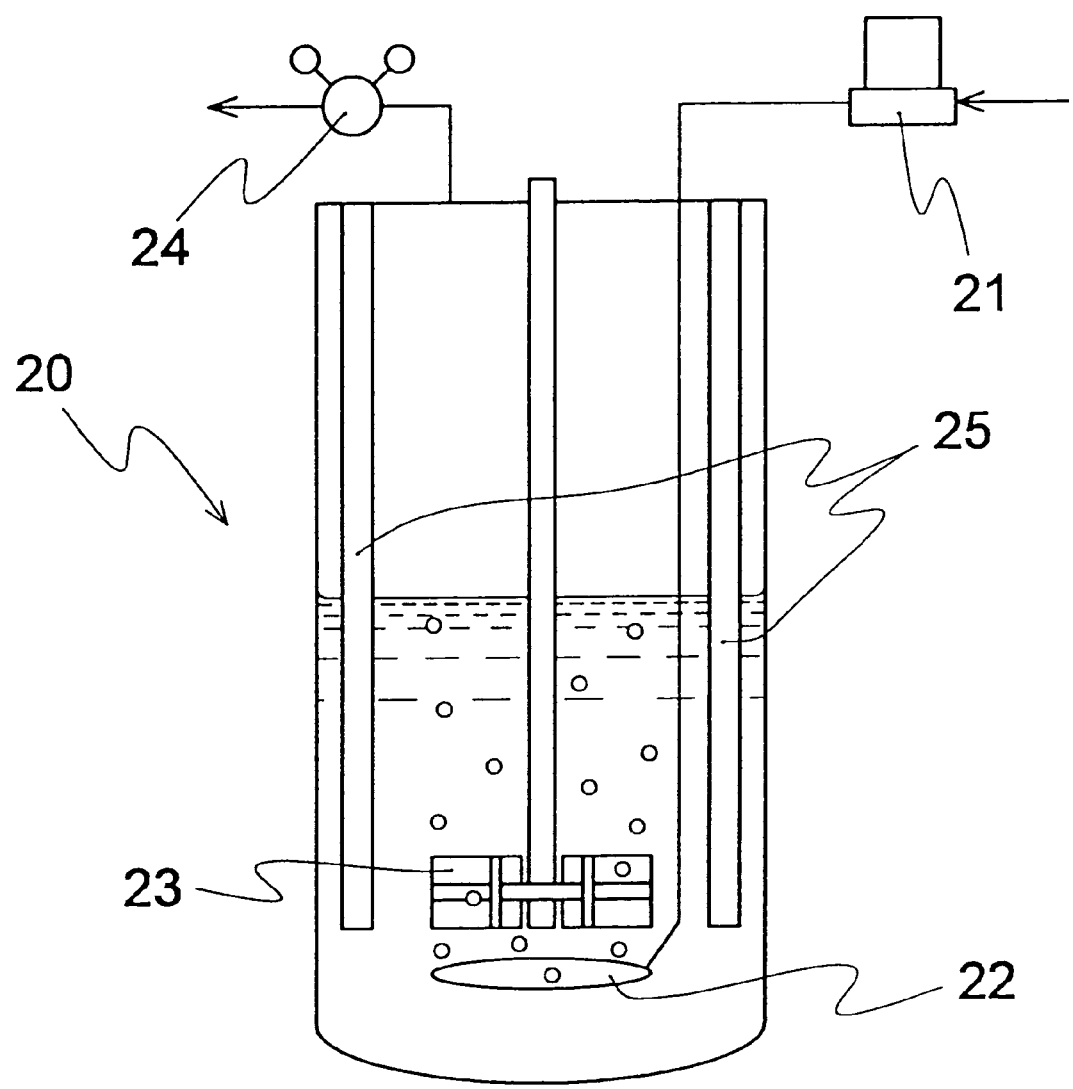
FIG. 8 is a diagrammatic cross-sectional view of the dip stirring type gas absorbing equipment with stirring tank used in Examples 1 to 3 of the present invention.
Figure 9:
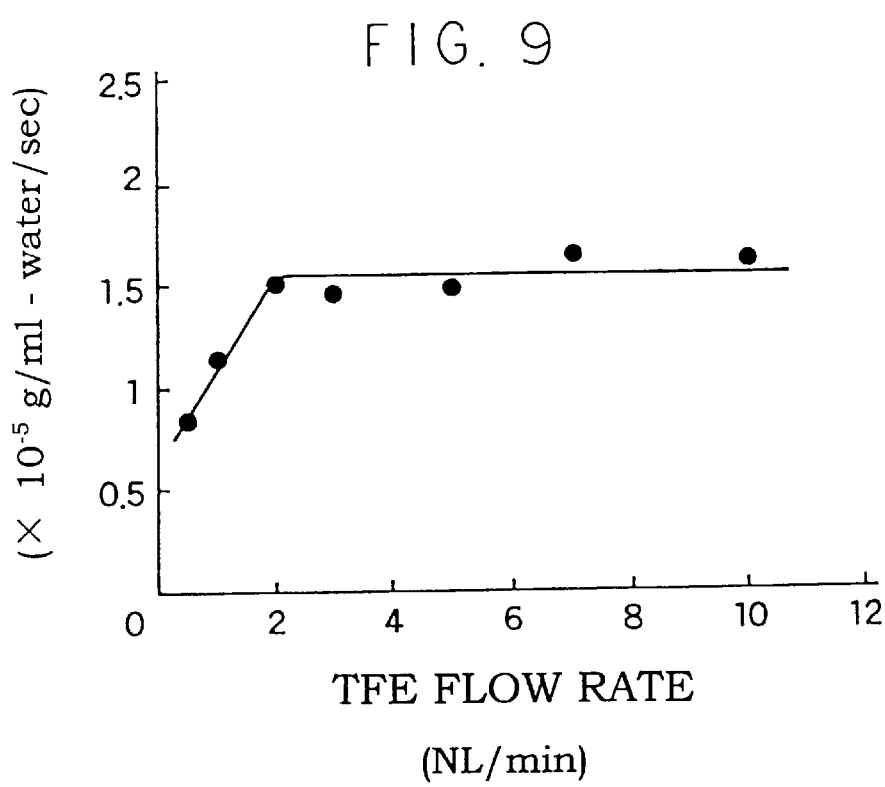
FIG. 9 is a graph showing a relation between the TFE flow rate and the PTFE polymerization rate in Example 1 of the present invention.

A vertical stainless steel autoclave 20 with a jacket (dip stirring type gas absorbing equipment with stirring tank) shown in FIG. 8 which could accommodate 3,000 parts (parts by weight, hereinafter the same) of water and was equipped with a mass flow controller 21, sparger ring 22 (with fine through holes at its bottom), disc turbine blades 23 (six blades), back pressure regulator 24 and baffle plates 25 (two plates) was charged with 1,767 parts of decarbonated demineralized water (hereinafter referred to as "pure water") and PTFE seed particles (average particle size: 99 nm, number of particles: $1\times10^{13}$/ml-water). Then after the inside of the autoclave was replaced with pure nitrogen gas sufficiently, the autoclave was evacuated and pressurized tetrafluoroethylene (hereinafter referred to as "TFE") was fed into the autoclave up to about 1 kg/cm$^2$G (0.1 MPa). Stirring was then carried out at 600 rpm (tip speed: 1.6 m/sec) with disc turbine blades 23 to keep the inside temperature at 60° C., and further pressurized TFE was fed up to 3 kg/cm$^2$G (0.3 MPa). TFE which was regulated to a given flow rate with the mass flow controller 21 was supplied through the sparger ring 22 at 0.5 NL/min. Excess TFE was exhausted through the back pressure regulator 24 to keep the internal pressure of the autoclave at 3 kg/cm$^2$G (0.3 MPa). Thereto was added, as a polymerization initiator, 0.177 part (100 ppm based on water) of ammonium persulfate (hereinafter referred to as "APS") dissolved in a small amount of pure water to start seed emulsion polymerization. During the reaction, the TFE flow rate and the internal pressure of the autoclave were kept constant. After 45-minute reaction, the stirring and supplying of TFE were stopped, and immediately un-reacted TFE monomer was purged. A solid content (polymer content, hereinafter referred to as "PC") of a PTFE emulsion generated in the autoclave was measured by a dry method and a seed content was subtracted therefrom to obtain the yield of polymer. Then the polymerization rate (g/ml-water/sec) was calculated by using the yield of polymer. Subsequently the polymerization was carried out under the same conditions except that the TFE flow rate was changed to 1 NL/min, 2 NL/min, 3 NL/min, 5 NL/min, 7 NL/min and 10 NL/min, and the respective polymerization rates were calculated. A relation between the TFE flow rate and the calculated polymerization rate is shown in FIG. 9. From FIG. 9, it is seen that when the TFE flow rate was not more than 2 NL/min, the polymerization rate as well as the TFE flow rate were increased and the polymerization rate was determined by the diffusion of TFE gas, and that when the TFE flow rate was not less than 2 NL/min, the polymerization rate was nearly constant even if the TFE flow rate was increased and thus the polymerization rate was determined by the polymerization reaction itself. The TFE flow rate of 2 NL/min is about 5.4 times the TFE amount to be consumed in the polymerization in which the polymerization rate is determined by the polymerization reaction itself.

EXAMPLE 2
(Emulsion polymerization of FEP with sparger)

Figure 10:
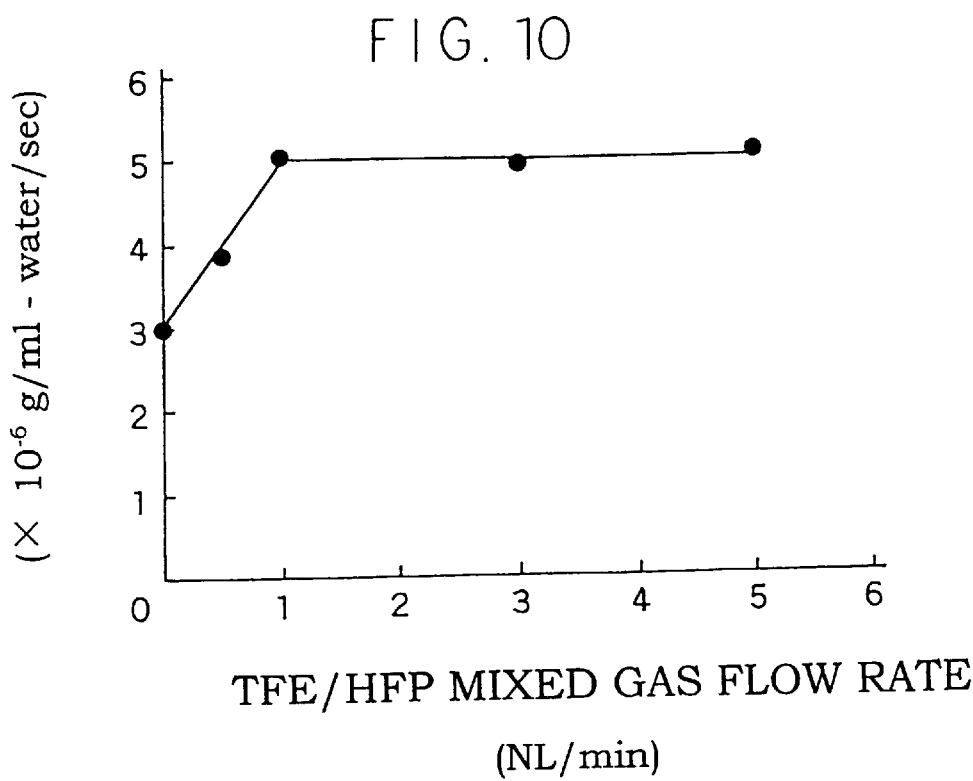
FIG. 10 is a graph showing a relation between the TFE/HFP mixed gas flow rate and the FEP polymerization rate in Example 2 of the present invention.

The same autoclave as in Example 1 was charged with 1,767 parts of pure water and FEP seed particles (average particle size: 67 nm, number of particles: $1\times10^3$/ml-water). Then after the inside of the autoclave was replaced with pure nitrogen gas sufficiently, the autoclave was evacuated and pressurized hexafluoropropylene (hereinafter referred to as "HFP") was fed into the autoclave up to about 1 kg/cm$^2$G (0.1 MPa). Stirring was carried out at 600 rpm (tip speed: 1.6 m/sec) with disc turbine blades to keep the inside temperature at 80° C., and then pressurized HFP was fed up to 4.9 kg/cm$^2$G (0.48 MPa) and further pressurized TFE was fed up to 8 kg/cm$^2$G (0.78 MPa). The gas phase was sampled, and according to an analysis with a gas chromatograph, TFE/HFP was 35/65% by mol. TFE/HFP mixed gas (35/65% by mol) which was regulated to a given flow rate with the mass flow controller was supplied through the sparger ring (flow rate: 0.5 NL/min). Excess TFE/HFP mixed gas was exhausted through the back pressure regulator to keep the internal pressure of the autoclave at 8 kg/cm$^2$G (0.78 MPa) and maintain the TFE/HFP ratio in the gas phase at 35/65% by mol. Thereto was added, as a polymerization initiator, 0.884 part (500 ppm based on water) of APS dissolved in a small amount of pure water to start seed emulsion polymerization. During the reaction, the TFE/HFP mixed gas flow rate, the internal pressure of the autoclave and the TFE/HFP ratio in the gas phase were kept constant. After 120-minute reaction, the stirring and supplying of the TFE/HFP mixed gas were stopped, and immediately un-reacted TFE/HFP mixed monomer was purged. A PC of a FEP emulsion generated in the autoclave was measured by a dry method and a seed content was subtracted therefrom to obtain the yield of polymer. Then the polymerization rate (g/ml-water/sec) was calculated by using the yield of polymer. As a result of NMR measurement (melt method), a HFP content in the produced FEP polymer was about 11% by weight. Subsequently the polymerization was carried out under the same conditions except that the TFE/HFP mixed gas flow rate was changed to 1 NL/min, 3 NL/min and 5 NL/min, and the respective polymerization rates were calculated. A relation between the TFE/HFP mixed gas flow rate and the calculated polymerization rate is shown in FIG. 10. From FIG. 10, it is seen that when the TFE/HFP mixed gas flow rate was not more than 1 NL/min, the polymerization rate as well as the TFE/HFP flow rate were increased and the polymerization rate was determined by the diffusion of TFE/HFP mixed gas monomer, and that when the TFE/HFP mixed gas flow rate was not less than 1 NL/min, the polymerization rate was nearly constant even if the TFE/HFP mixed gas flow rate was increased and thus the polymerization was determined by the polymerization reaction itself. In FIG. 10, a plot at the time when the TFE/HFP mixed gas flow rate is zero is in case where the mixed gas was fed directly to the gas phase without being passed through the sparger ring in an amount corresponding to the amount of monomer to be consumed by the polymerization so that the polymerization pressure was kept constant without using the back pressure regulator. In other words, that plot is in the case of conventional polymerization process (the diffusion of monomer determines the polymerization rate), and it is seen that the polymerization rate is only about 60% of that of the case where the flow rate is not less than 1 NL/min and the polymerization rate is determined by the polymerization reaction itself (theoretical polymerization rate).

EXAMPLE 3
(Emulsion polymerization of PVDF with sparger)

Figure 11:
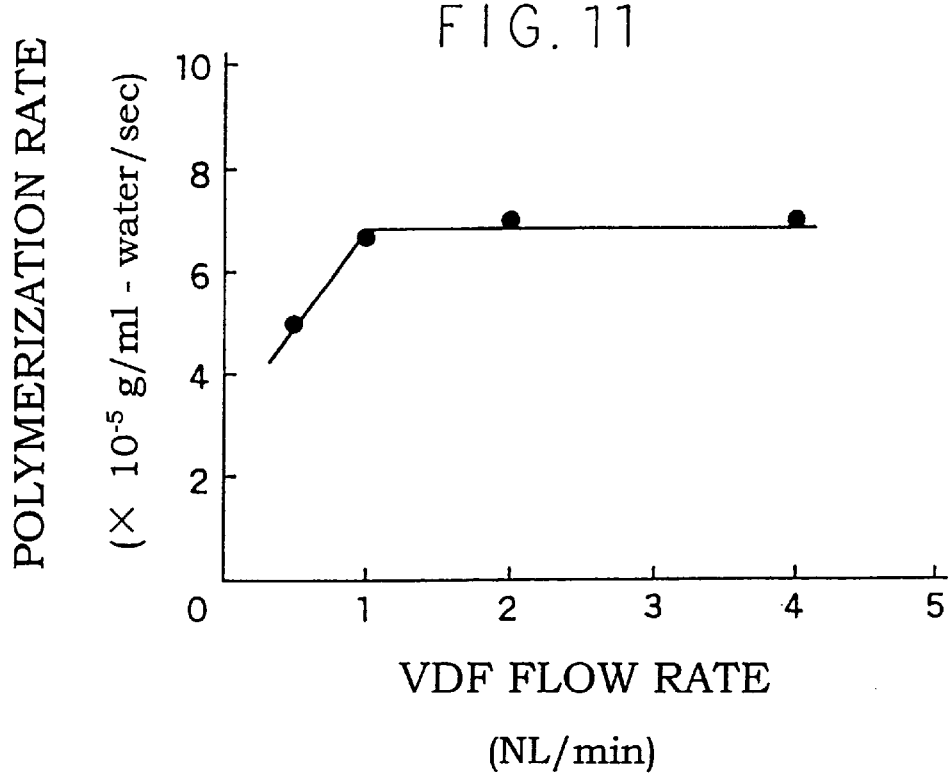
FIG. 11 is a graph showing a relation between the VDF flow rate and the PVDF polymerization rate in Example 3 of the present invention.

The same autoclave as in Example 1 was charged with 1,767 parts of pure water and PVDF seed particles (average particle size: 59 nm, number of particles: $1.5 \times 10^{13}$/ml-water). Then after the inside of the autoclave was replaced with pure nitrogen gas sufficiently, the autoclave was evacuated and pressurized vinylidene fluoride (hereinafter referred to as "VDF") was fed into the autoclave up to about 1 kg/cm$^2$G (0.1 MPa). Stirring was then carried out at 600 rpm (tip speed: 1.6 m/sec) with disc turbine blades to keep the inside temperature at 80° C., and further pressurized VDF was fed up to 8 kg/cm$^2$G (0.78 MPa). VDF which was regulated to a given flow rate with the mass flow controller was supplied through the sparger ring (flow rate: 0.5 NL/min). Excess VDF was exhausted through the back pressure regulator to keep the internal pressure of the autoclave at 8 kg/cm$^2$G (0.78 MPa). Thereto was added, as a polymerization initiator, 1.767 parts (1,000 ppm based on water) of APS dissolved in a small amount of pure water to start seed emulsion polymerization. During the reaction, the VDF flow rate and the internal pressure of the autoclave were kept constant. After 60-minute reaction, the stirring and supplying of VDF were stopped, and immediately un-reacted VDF monomer was purged. A PC of a PVDF emulsion generated in the autoclave was measured by a dry method and a seed content was subtracted therefrom to obtain the yield of polymer. Then the polymerization rate (g/ml-water/sec) was calculated by using the yield of polymer. Subsequently the polymerization was carried out under the same conditions except that the VDF flow rate was changed to 1 NL/min, 2 NL/min and 4 NL/min and the respective polymerization rates were calculated. A relation between the VDF flow rate and the calculated polymerization rate is shown in FIG. 11. From FIG. 11, it is seen that when the VDF flow rate was not more than 1 NL/ min, the polymerization rate as well as the VDF flow rate were increased and the polymerization rate was determined by the diffusion of VDF gas, and that when the VDF flow rate was not less than 1 NL/min, the polymerization rate was nearly constant even if the VDF flow rate was increased and thus the polymerization rate was determined by the polymerization reaction itself. The VDF flow rate of 1 NL/min is about 3.9 times the VDF amount to be consumed in the polymerization in which the polymerization rate is determined by the polymerization reaction itself.

EXAMPLE 4
(Emulsion polymerization of FEP with FULLZONE blade)

Figure 12:
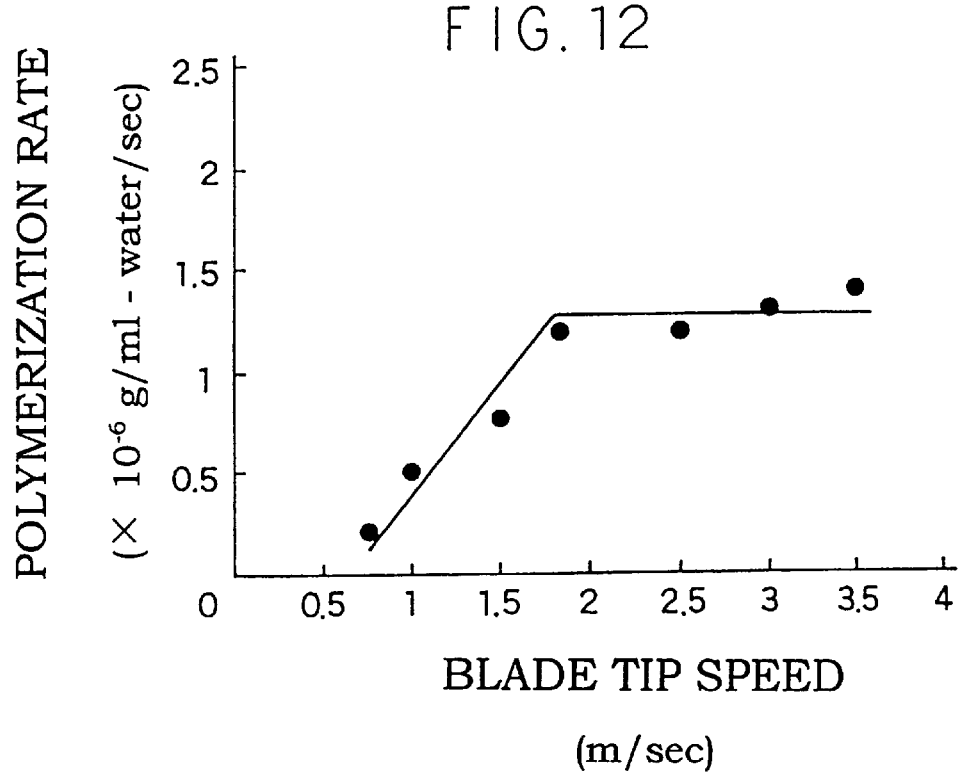
FIG. 12 is a graph showing a relation between the tip speed of full-zone blade and the FEP polymerization rate in Example 4 of the present invention.

A vertical stainless steel autoclave with a jacket (stirring type gas absorbing equipment with stirring tank having a large blade) which could accommodate 3,000 parts of water and was equipped with a FULLZONE blade (available from Shinko Pantec Co., Ltd.) and two baffle plates was charged with 1,767 parts of pure water and FEP seed particles (average particle size: 33 nm, number of particles: $1.4 \times 10^{13}$/ml-water). Then after the inside of the autoclave was replaced with pure nitrogen gas sufficiently, the autoclave was evacuated and 645 parts of liquid HFP was fed into the autoclave. Stirring was carried out at 205 rpm (tip speed: 0.75 m/sec) with FULLZONE blade to keep the inside temperature at 80° C., and then pressurized TFE/HFP mixed gas (93.5/6.5% by mol) was fed by a compressor up to 42 kg/cm$^2$G (4.12 MPa). The gas phase was sampled, and a composition of it was analyzed with a gas chromatograph. The composition was TFE/HFP =30/70% by mol. Thereto was added, as a polymerization initiator, 1.325 parts (750 ppm based on water) of APS dissolved in a small amount of pure water to start seed emulsion polymerization. Since the internal pressure of the autoclave lowered with advance of the reaction, the TFE/HFP mixed gas (93.5/6.5% by mol) was added continuously from the gas phase to keep the pressure constant at 42 kg/cm$^2$G (4.12 MPa). After the reaction had been carried out until the PC became about 10% which was obtained from the total amount of the additional TFE/HFP mixed gas, the stirring and supplying of the TFE/HFP mixed gas were stopped, and immediately un-reacted TFE/HFP mixed gas monomer was purged. A PC of a FEP emulsion generated in the autoclave was measured by a dry method and a seed content was subtracted therefrom to obtain the yield of polymer. Then the polymerization rate (g/ml-water/sec) was calculated by using the yield of polymer and a period of time required for the reaction. Subsequently the polymerization was carried out under the same conditions except that the number of rotations of the FULLZONE blade was changed to 273 rpm (tip speed: 1 m/sec), 409 rpm (1.5 m/sec), 500 rpm (1.83 m/sec), 682 rpm (2.5 m/sec), 819 rpm (3 m/sec) and 955 rpm (3.5 m/sec) and the respective polymerization rates were calculated. A relation between the tip speed and the obtained polymerization rate is shown in FIG. 12. From FIG. 12, it is seen that when the tip speed was not more than 1.8 m/ sec, the polymerization rate as well as the tip speed were increased and the polymerization rate was determined by the diffusion of monomer gas, and that when the tip speed was not less than 1.8 m/sec, the polymerization rate was nearly constant even if the tip speed was increased and the polymerization rate was determined by the polymerization reaction itself. As a result of NMR measurement (melt method), a HFP content in the produced FEP polymer was constant at about 9.5% by weight when the tip speed was not less than 1.8 m/sec, and in the case of less than 1.8 m/sec, the HFP content was higher than that.

EXAMPLE 5 AND COMPARATIVE EXAMPLE 1
(Emulsion polymerization of FEP with horizontal stirring tank)

An experiment for polymerization of FEP was carried out by using a horizontal stirring tank according to Example 1 of JP-A-61-228008. Namely, a horizontal stainless steel stirring tank with a jacket which had a ratio of length to diameter of about 1.5 and can accommodate 80 parts of water was charged with 55 parts of pure water and 0.077 part of ammonium perfluorononanoate. Subsequently the tank was sufficiently purged with pure nitrogen gas and then with TFE gas. The inside temperature of the tank was raised to 95° C., and stirring was started at a given number of rotations mentioned later. The internal pressure of the tank was increased to 27 kg/cm$^2$G (2.6 MPa) with HFP gas and then to 42 kg/cm$^2$G (4.12 MPa) with TFE gas. Thereto was added, as a polymerization initiator, 0.0413 part (750 ppm based on water) of APS dissolved in a small amount of pure water to start the polymerization. Since the internal pressure of the tank lowered with advance of the reaction, TFE gas was continuously supplied from the gas phase to keep the internal pressure constant at 42 kg/cm$^2$G (4.12 MPa). When the total amount of the additional TFE gas reached 13 parts, the stirring and supplying of the TFE gas were stopped, and immediately un-reacted TFE/HFP monomer mixture was purged. A PC of FEP emulsion produced in the autoclave was measured by a dry method to give the yield of polymer. The polymerization rate (g/mlwater/sec) was calculated by using the yield of polymer and a period of time required for the reaction. In Comparative Example 1, the number of rotations was adjusted to 34 rpm (tip speed: 0.36 m/sec) in the same manner as in Example 1 of JP-A-61-228008. In that case, the polymerization rate became $3.9 \times 10^{-5}$ g/ml-water/sec. On the other hand, in Example 5, the polymerization was carried out at 96 rpm (tip speed: 1 m/sec) and 191 rpm (tip speed: 2 m/sec), and in the both cases, the polymerization rate was about $5.6 \times 10-5$ g/ml-water/sec. In Example 5 where the tip speed was adjusted to not less than 1 m/sec, since the polymerization rate was not varied by the tip speed, it is understood that the polymerization rate was determined by the polymerization reaction itself. On the contrary, it is understood that the polymerization rate of conventional polymerization process of Comparative Example 1 where the tip speed was low was merely about 70% of that of Example 5, and the polymerization rate was determined by the diffusion of monomer.

INDUSTRIAL APPLICABILITY

According to the present invention, in batch polymerization reaction of monomers containing at least one of fluorine-containing olefin monomers in a gaseous phase or supercritical phase in an aqueous medium, since the polymerization rate can be determined by the polymerization reaction (growth reaction) or a reaction close thereto but not by the diffusion of monomer by using a gas/liquid contacting apparatus, a maximum polymerization rate which is theoretically attainable or a polymerization rate close thereto can be accomplished. As a result, as compared with conventional polymerization processes, a degree of polymerization can be increased, which is advantageous from industrial point of view.

What is claimed is:

1. A polymerization process for batch-polymerizing at least one of fluorine-containing olefin monomers in gaseous phase or supercritical phase or a monomer mixture of said fluorine-containing olefin monomer and other monomer copolymerizable therewith in an aqueous medium while being diffused in the aqueous medium; comprises an amount of the monomer or monomer mixture to be diffused in the aqueous medium being not less than 80% of a theoretical consumption of the monomer or monomer mixture when polymerized at a theoretical polymerization rate.

2. The polymerization process of claim 1, wherein an amount of said monomer or monomer mixture to be diffused is not less than the theoretical consumption.

3. The polymerization process of claim 1, wherein said fluorine-containing olefin is tetrafluoroethylene, hexafluoropropylene, vinylidene fluoride or chlorotrifluoroethylene.

4. The polymerization process of claim 1, wherein the diffusion of said monomer or monomer mixture into the aqueous medium is carried out with a gas/liquid contacting apparatus.

5. The polymerization process of claim 4, wherein said gas/liquid contacting apparatus is a gas absorbing equipment with stirring tank.

6. The polymerization process of claim 5, wherein said gas absorbing equipment with stirring tank is a gas absorbing equipment of dip stirring type, surface stirring type, self-suction stirring type, horizontal stirring type or stirring type with large blade.

7. The polymerization process of claim 4, wherein said gas/liquid contacting apparatus is a shaking type reactor.

8. The polymerization process of claim 4, wherein said gas/liquid contacting apparatus is a liquid circulation type reactor.

9. The polymerization process of claim 3, wherein the diffusion of said monomer or monomer mixture into the aqueous medium is carried out with a gas/liquid contacting apparatus.

10. The polymerization process of claim 9, wherein said gas/liquid contacting apparatus is a gas absorbing equipment with stirring tank.

11. The polymerization process of claim 10, wherein said gas absorbing equipment with stirring tank is a gas absorbing equipment of dip stirring type, surface stirring type, self-suction stirring type, horizontal stirring type or stirring type with large blade.

12. The polymerization process of claim 9, wherein said gas/liquid contacting apparatus is a shaking type reactor.

13. The polymerization process of claim 9, wherein said gas/liquid contacting apparatus is a liquid circulation type reactor.

* * * * *